(12) United States Patent
Martinez Vite

(10) Patent No.: US 11,078,943 B2
(45) Date of Patent: Aug. 3, 2021

(54) FASTENER ASSEMBLY

(71) Applicant: GM GLOBAL TECHNOLOGY OPERATIONS LLC, Detroit, MI (US)

(72) Inventor: Hector Alberto Martinez Vite, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

(21) Appl. No.: 16/695,919

(22) Filed: Nov. 26, 2019

(65) Prior Publication Data

US 2021/0156411 A1    May 27, 2021

(51) Int. Cl.
| | |
|---|---|
| *F16B 21/00* | (2006.01) |
| *F16B 21/02* | (2006.01) |
| *H01M 50/30* | (2021.01) |
| *F16B 13/08* | (2006.01) |

(52) U.S. Cl.
CPC .......... *F16B 21/02* (2013.01); *F16B 13/0808* (2013.01); *H01M 50/394* (2021.01); *H01M 2220/20* (2013.01)

(58) Field of Classification Search
CPC ......... F16B 21/08; F16B 21/02; F16B 21/086
USPC ....... 411/340, 363; 285/194, 139.1, 88, 307; 292/11
See application file for complete search history.

(56) References Cited

U.S. PATENT DOCUMENTS

| | | | | |
|---|---|---|---|---|
| 4,294,570 | A * | 10/1981 | Meschnig | F16B 21/10 411/103 |
| 4,668,145 | A * | 5/1987 | Hirohata | F16B 5/065 411/45 |
| 6,213,700 | B1 * | 4/2001 | Everard | F16B 5/0258 411/182 |
| 7,150,596 | B2 * | 12/2006 | Diaz | F16B 5/02 411/344 |
| 8,393,058 | B2 * | 3/2013 | Okada | F16B 21/086 24/297 |
| 8,439,613 | B1 * | 5/2013 | Prentice | F16B 39/28 411/21 |
| 8,979,460 | B2 * | 3/2015 | Ostergren | F16B 21/086 411/508 |
| 9,599,140 | B2 * | 3/2017 | Diep | F16B 37/043 |
| 9,850,927 | B2 * | 12/2017 | Bradley | F16B 5/01 |
| 9,939,003 | B2 * | 4/2018 | Ormsby | F16B 21/086 |
| 10,260,546 | B2 * | 4/2019 | Goldberg | B60R 19/50 |

* cited by examiner

Primary Examiner — Gary W Estremsky

(57) ABSTRACT

A fastener assembly according to the present disclosure includes a fastener head, a shank depending from the fastener head, and at least one wing member pivotably coupled to the shank. The shank extends along a central axis, and the wing member is pivotable about a pivot axis extending parallel to the central axis. The wing member is pivotable between a stowed position and a deployed position. The wing member has a fork configured to receive a workpiece therein when in the deployed position.

17 Claims, 3 Drawing Sheets

FASTENER ASSEMBLY

INTRODUCTION

The present disclosure relates generally to fastener assemblies for securing components to workpieces.

Fastener assemblies are sometimes mounted to one or more workpieces and typically have an end that can be secured with another additional component. In this way, the components are secured to the workpiece(s) via the fastener assemblies. The ends of the fastener assemblies can be studs or some other kind of fastening end to enable securement with the additional components.

Products of manufacture—and hence the workpieces they are made of—are increasingly incorporating lighter weight materials like aluminum, magnesium, and polymer composite materials into their construction. Sometimes the products of manufacture have an enclosed structure, such as a box or tubing, making the associated fastener assemblies inaccessible from an interior of the enclosed structure and only accessible from an exterior of the enclosed structure (often termed single-sided or blind fastener assemblies). These kinds of applications present unique challenges with the use of fastener assemblies.

SUMMARY

A fastener assembly according to the present disclosure includes a fastener head, a shank depending from the fastener head, and at least one wing member pivotably coupled to the shank. The shank extends along a central axis, and the wing member is pivotable about a pivot axis extending parallel to the central axis. The wing member is pivotable between a stowed position and a deployed position. The wing member has a fork configured to receive a workpiece therein when in the deployed position.

In an exemplary embodiment, the at least one wing member comprises at least two wing members.

In an exemplary embodiment, the shank has an outer periphery provided with at least one pocket. The pocket has a planar surface. The wing member is coupled to the planar surface.

In an exemplary embodiment, the at least one wing member comprises at least one inner leg, a first outer leg, and a second outer leg. The at least one inner leg is disposed proximate the shank. A respective inner leg of the at least one inner leg is pivotably coupled to the shank. The fork is defined by a junction between the first outer leg and the second outer leg.

In an exemplary embodiment, the wing member is provided with a living hinge proximate the shank. The wing member is pivotably coupled to the shank via the living hinge.

In an exemplary embodiment, the fastener head and the shank have a bore extending therethrough, with the bore extending along the central axis.

In an exemplary embodiment, the assembly additionally includes a flange disposed between the fastener head and the shank, with the flange extending radially outboard of the shank. Such embodiments may also include a seal member disposed at a lower surface of the flange.

A method of assembly according to the present disclosure includes providing a fastener having a fastener head, a shank depending from the fastener head, and at least one wing member pivotably coupled about the shank, with the wing member being pivotable between a stowed position and a deployed position, and with the wing member having a fork portion. The method additionally includes providing a workpiece having an aperture therein. The method also includes inserting the shank at least partially into the aperture with the wing member disposed on the stowed position. The method further includes rotating the fastener about a central axis of the shank, wherein rotating the fastener pivots the wing member to the deployed position and retains the workpiece in the fork portion.

In an exemplary embodiment, the at least one wing member comprises at least two wing members, and rotating the fastener pivots the at least two wing members to respective deployed position and retains the workpiece in respective fork portions of the at least two wing members.

In an exemplary embodiment, the fastener head and the shank have a bore extending therethrough, the bore extending along the central axis. In such embodiments, the method may additionally include coupling a vent tube to the fastener head in fluid communication with the bore.

In an exemplary embodiment, the fastener additionally includes a flange disposed between the fastener head and the shank, the flange extending radially outboard of the shank. In such embodiments, the fastener may additionally include a seal member disposed at a lower surface of the flange, and rotating the fastener may engage the seal member in a sealing relationship between the fastener and a periphery of the aperture.

Embodiments according to the present disclosure provide a number of advantages. For example, the present disclosure provides a fastener capable of coupling to a workpiece without accessing the interior of the workpiece, and moreover does so in a fashion which prevents backing out of the fastener.

The above advantage and other advantages and features of the present disclosure will be apparent from the following detailed description of the preferred embodiments when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Known fastener assemblies face challenges when used in conjunction with workpiece(s) which are part of a partially or wholly enclosed component in which an interior of the enclosed component is largely or entirely inaccessible. As will be discussed in further detail below, fastener embodiments according to the present disclosure may be employed with various workpiece stack-ups and with various workpieces, including those where the interior of the enclosed component is largely or entirely inaccessible.

Figure 1:
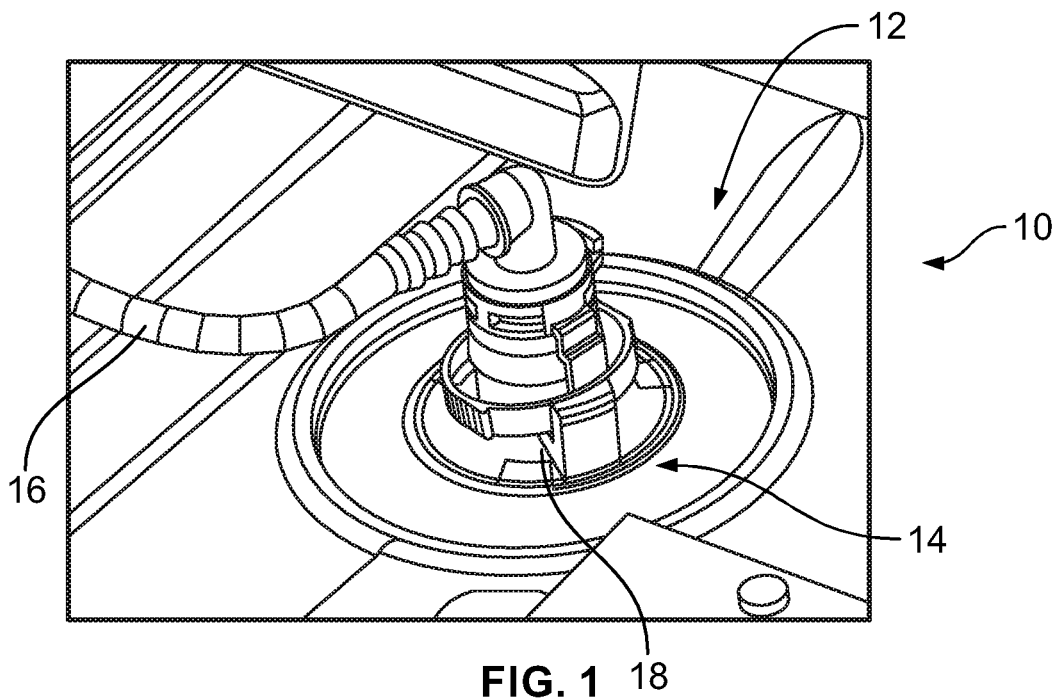
FIG. 1 is an isometric view of a fastener assembly according to an embodiment of the present disclosure.
Figure 3:
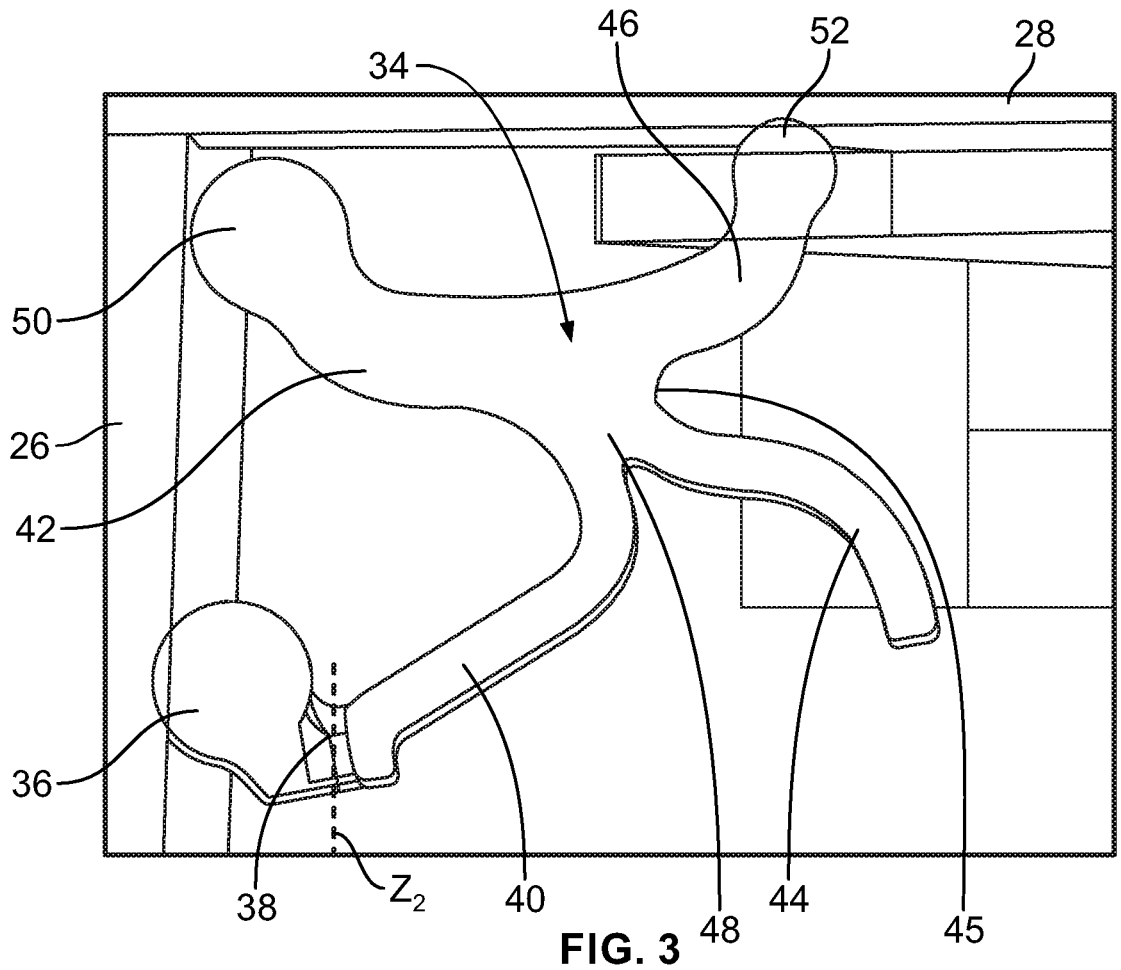
FIG. 3 is a detail view of a fastener according to an embodiment of the present disclosure.

Referring now to FIG. 1, an assembly 10 includes a workpiece 12. In the illustrated embodiment the workpiece 12 comprises a battery housing having an aperture or vent port 14 to which a vent tube 16 is assembled. Such a workpiece 12 may be disposed about a battery for an automotive vehicle. However, in other embodiments, the workpiece 12 may comprise any other suitable component or components comprising metal, plastic, or other relatively rigid material. The assembly 10 also includes a fastener 18 to which the vent tube 16 is coupled.

As may be seen, in this embodiment the underside or interior of the workpiece 12 can be largely or entirely inaccessible for tooling that might otherwise assist with the installation of a fastener assembly. In such an embodiment, the fastener assemblies are referred to as single-sided or blind fastener assemblies.

Figure 2A:
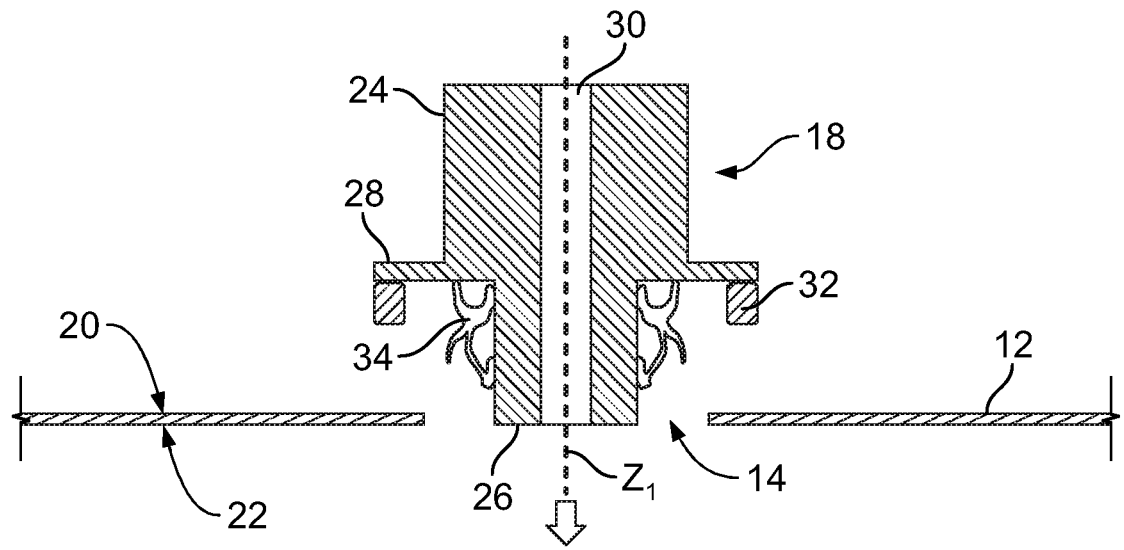
FIGS. 2A-2C schematically illustrate installation of a fastener to a workpiece according to an embodiment of the present disclosure.

Referring now to FIGS. 2-6, the fastener 18 and assembly thereof to the workpiece 12 are illustrated in greater detail. As shown in FIG. 2, the workpiece 12 has an upper surface 20 and a lower surface 22, with the aperture 14 extending from the upper surface 20 to the lower surface 22. As discussed previously, the lower surface 22 is largely or entirely inaccessible for tooling that might assist with installation of the fastener 18.

The fastener 18 includes a head 24, a shank 26, and a flange 28 disposed between the head 24 and the shank 26. A bore 30 extends from the head 24 through the shank 26 along a central axis $Z_1$. In an exemplary embodiment, the head 24, shank 26, and flange 28 are integrally formed of a common material, e.g. plastic or metal, which may be chosen according to the desired characteristics for a given implementation. The fastener 18 may be molded, machined, or formed in any other suitable fashion according to the material composition of the fastener 18 and desired characteristics thereof.

The head 24 may be provided with one or more features to facilitate installation of the fastener 18, e.g. a hexagonal shape adapted to be driven by a standard hex driver. Other features are, of course, possible. In exemplary embodiments which omit the bore 30, the head 24 may be provided with one or more slots or other features adapted to be driven by standard drivers such as flat-blade, cross-head, or hexagonal drivers.

The flange 28 extends radially outward from a lower portion of the head 24, e.g. in a direction generally orthogonal to the central axis $Z_1$. The flange 28 has an outer diameter exceeding a diameter of the aperture 14, such that when the fastener 18 is fully inserted into the workpiece 12 the flange 28 is superposed over the aperture 14. As will be appreciated by one of ordinary skill in the art, in some embodiments the flange 28 may be integrated with the head 24, e.g. by providing a head 24 having an outer diameter exceeding the diameter of the aperture 14. The lower surface of the flange 28 is provided with an annular sealing member 32. The sealing member 32 may be formed of any suitable sealing material, including but not limited to natural or synthetic rubber.

The shank 26 is provided with a plurality of pivotable wing members 34. An illustrative wing member 36 is depicted in further detail in FIG. 3. As may be seen, the wing member 34 is connected to the shank 26 at an attachment point 36. The wing member 34 may be connected to the shank 26 via any suitable attachment means, including but not limited to adhesive or co-molding. In an exemplary embodiment the wing members 34 are formed of a plastic material. The wing member 34 is provided with a hinge portion 38 proximate the attachment point 36. The hinge portion 38 enables the respective wing member 34 to pivot relative to the shank 26 about a pivot axis $Z_2$. In an exemplary embodiment, the pivot axis $Z_2$ is generally parallel to the central axis $Z_1$. The hinge portion 38 may be of any suitable hinging configuration, and in an exemplary embodiment is a living hinge.

The wing members 34 have a generally x-shaped body with a first inner leg 40, a second inner leg 42, a first outer leg 44, and a second outer leg 46 all extending from a central portion 48. The first inner leg 40 is coupled to the attachment point 36, the second inner leg 42 is coupled to an inner lobe 50 disposed proximate the shank 26, and the second outer leg 46 is coupled to an outer lobe 52 disposed proximate the flange 28. The inner lobe 50 and outer lobe 52 are provided with curved profiles to facilitate sliding motion of the wing member 34 relative to the shank 26 and flange 28, respectively. The first outer leg 44 extends freely away from the shank 26 and flange 28. A fork 45 is thereby defined between the first outer leg 44 and the second outer leg 46, proximate the central portion 48.

The wing members 34 are pivotable between a stowed position and a deployed position. In the stowed position, shown most clearly in FIGS. 5 and 6, the central portion 48 and outer legs 44, 46 are positioned proximate the shank 26. In the deployed position, shown in phantom in FIGS. 5 and 6, the central portion 48 and outer legs 44, 46 are pivoted further away from the shank 26 relative to the stowed position.

Figure 5:
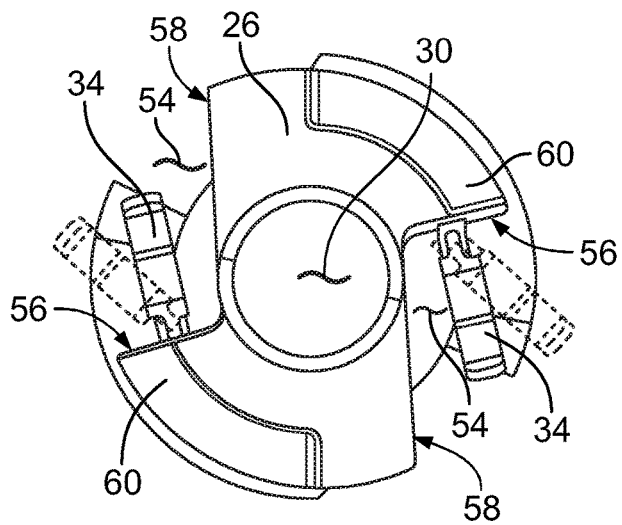
FIG. 5 is a bottom view of a fastener installed to a workpiece according to an embodiment of the present disclosure.
Figure 6:
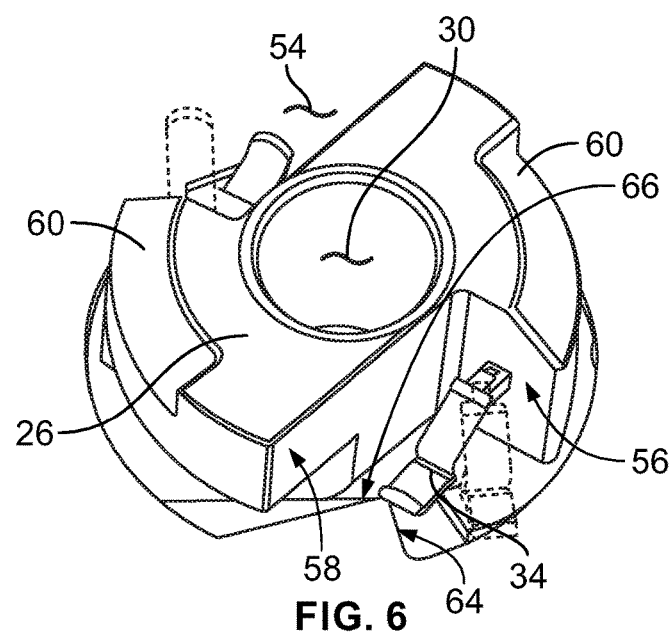
FIG. 6 is a bottom isometric view of a fastener installed to a workpiece according to an embodiment of the present disclosure.

As shown most clearly in FIGS. 5 and 6, the shank 26 is not fully circular in cross-section. Rather, the shank 26 is provided with a plurality of pockets 54 within which the wing members 34 are disposed. In the illustrated embodiment each pocket 54 comprises a first planar face 56 and a second planar face 58, with the wing member 34 being coupled to the first planar face 56. Moreover, in the illustrated embodiment the shank 26 is provided with a plurality of tapered sections 60 to facilitate insertion of the shank 26 into the aperture 14. However, the specific geometry may vary according the requirements of a given implementation.

Figure 4:
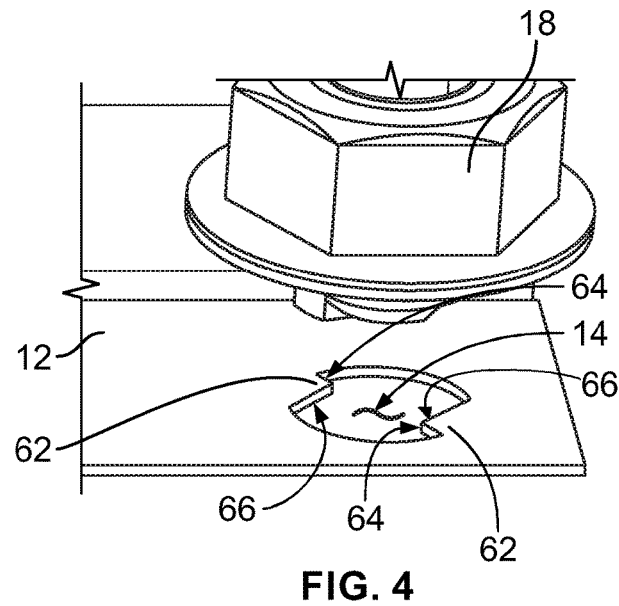
FIG. 4 is an isometric view of installation of a fastener to a workpiece according to an embodiment of the present disclosure.

Likewise, as shown most clearly in FIG. 4, the aperture 14 is not fully circular in shape. Rather, the aperture 14 is provided with a plurality of protrusions 62 corresponding in number to the pockets 54. In the illustrated embodiment each respective protrusion is generally triangular in shape, comprising a first linear portion 64 and a second linear portion 66. However, the specific geometry may vary according the requirements of a given implementation.

As may be seen, the profile of the aperture 14 is generally similar to the cross-section of the shank 26. However, the width between the second linear portions 66 of the aperture is greater than the width between the second planar faces 58 of the shank 26. The aperture 14 is thereby sized to accommodate insertion of the shank 26 when the wing members 34 are disposed in the stowed position.

Returning to FIG. 2A, during installation of the fastener 18 into the workpiece 12, the wing members 34 are initially disposed in a stowed position. The fastener 18 is inserted into the aperture 14 as shown by the arrow, e.g. in a direction generally parallel to the central axis $Z_1$.

Figure 2B:
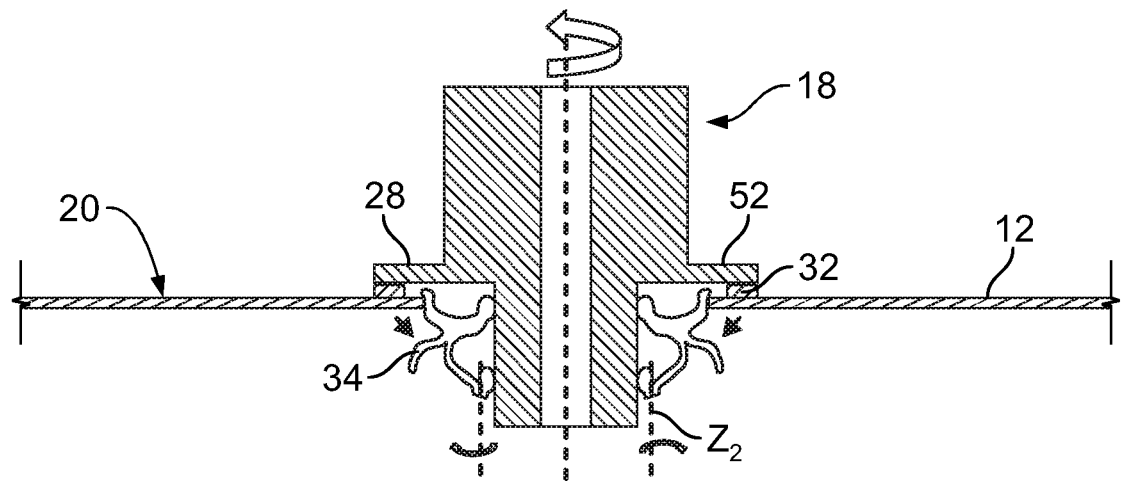

Upon full insertion, the sealing member 32 is compressed between the flange 28 and the upper surface 20 of the workpiece 12. The fastener 18 is rotated in a first direction about the central axis $Z_1$, e.g. until the second planar face 58 of the shank 26 abuts the second linear portion 66 of the aperture. The wing members 34 are then free to begin pivoting about the axes $Z_2$ to the deployed position. This configuration is illustrated in FIG. 2B, with the workpiece 12 disposed generally in register with the outer lobe 52.

Figure 2C:
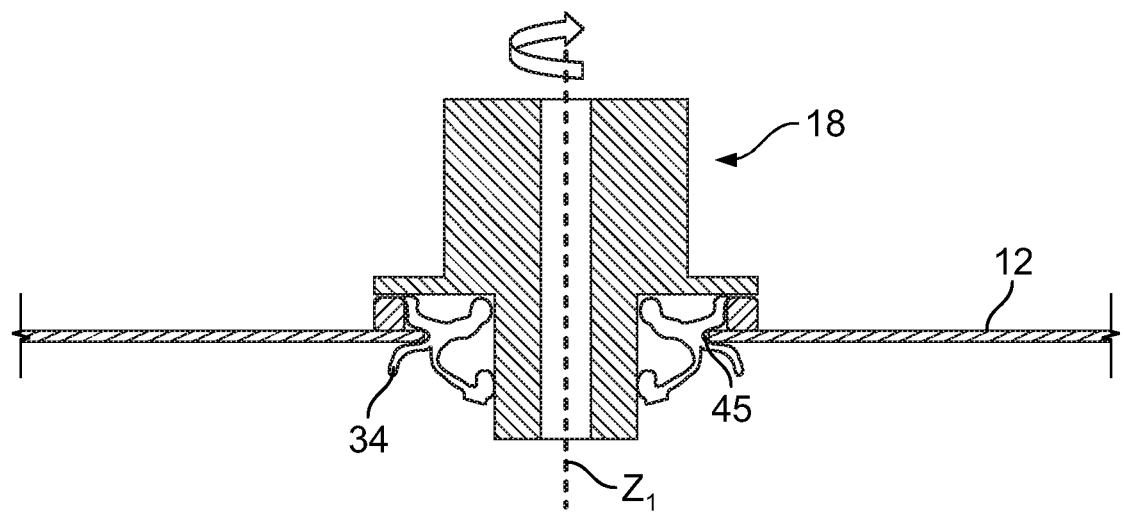

The fastener 18 is then rotated in a second direction about the central axis $Z_1$ to engage the wing members 34 with the workpiece 12. In an exemplary embodiment, this comprises rotating the fastener 18 until the wing members 34 contact the first linear portion 64 of the aperture 14, at which point further rotation of the fastener 18 relative to the aperture 14 drives the wing members 34 to the fully deployed position. As the wing members 34 pivot to the fully deployed position, the workpiece 12 is guided along the second outer leg 46 and is captured at the fork 45, as illustrated in FIG. 2C and in phantom in FIGS. 5 and 6.

Advantageously, in this configuration, backing out of the fastener 18 is inhibited due to interference between the wing members 34 and the workpiece 12. Moreover, this is accomplished without necessitating access to the interior of the workpiece 12. Furthermore, the sealing member 32 is maintained in a sealing relationship between the flange 28 and workpiece 12.

In the aforementioned embodiment wherein the aperture 14 is a vent port in a battery, the vent tube 16 may thereafter be coupled in fluid engagement with the bore 30. However, in other embodiments the fastener 18 may be used for other purposes, e.g. to provide a guide post, to couple together multiple workpieces 12, or for any other suitable purpose.

The fastener assemblies detailed in this description are hence more effective in use than previously shown. While the fastener assemblies are described below in the context of automotive components and structures, skilled artisans should appreciate that the fastener assemblies have wide-ranging application and can be employed in other contexts such as aerospace, marine, railway, building construction, home appliance, and industrial equipment applications, among others.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A fastener assembly comprising:
a fastener head;
a shank depending from the fastener head, the shank extending along a central axis; and
at least one wing member pivotably coupled to the shank, the wing member being pivotable about a pivot axis extending parallel to the central axis, the wing member being pivotable between a stowed position and a deployed position, the wing member having a fork configured to receive a workpiece therein when in the deployed position, wherein the at least one wing member comprises at least one inner leg, a first outer leg, and a second outer leg, the at least one inner leg being disposed proximate the shank, a respective inner leg of the at least one inner leg being pivotably coupled to the shank, the fork being defined by a junction between the first outer leg and the second outer leg.

2. The assembly of claim 1, wherein the at least one wing member comprises at least two wing members.

3. The assembly of claim 1, wherein the shank has an outer periphery provided with at least one pocket, the pocket having a planar surface, the wing member being coupled to the planar surface.

4. The assembly of claim 1, wherein the wing member is provided with a living hinge proximate the shank, wherein the wing member is pivotably coupled to the shank via the living hinge.

5. The assembly of claim 1, wherein the fastener head and the shank have a bore extending therethrough, the bore extending along the central axis.

6. The assembly of claim 1, further comprising a flange disposed between the fastener head and the shank, the flange extending radially outboard of the shank.

7. The assembly of claim 6, further comprising a seal member disposed at a lower surface of the flange.

8. A fastener assembly comprising:
a fastener head;
a shank depending from the fastener head, the shank extending along a central axis; and
at least one wing member pivotably coupled to the shank, the wing member being pivotable about a pivot axis extending parallel to the central axis, the wing member being pivotable between a stowed position and a deployed position, the wing member having a fork configured to receive a workpiece therein when in the deployed position; wherein the wing member is provided with a living hinge proximate the shank, wherein the wing member is pivotably coupled to the shank via the living hinge.

9. The assembly of claim 8, wherein the at least one wing member comprises at least two wing members.

10. The assembly of claim 8, wherein the shank has an outer periphery provided with at least one pocket, the pocket having a planar surface, the wing member being coupled to the planar surface.

11. The assembly of claim 8, wherein the fastener head and the shank have a bore extending therethrough, the bore extending along the central axis.

12. The assembly of claim 8, further comprising a flange disposed between the fastener head and the shank, the flange extending radially outboard of the shank.

13. The assembly of claim 12, further comprising a seal member disposed at a lower surface of the flange.

14. A fastener assembly comprising:
   a fastener head;
   a shank depending from the fastener head, the shank extending along a central axis;
   at least one wing member pivotably coupled to the shank, the wing member being pivotable about a pivot axis extending parallel to the central axis, the wing member being pivotable between a stowed position and a deployed position, the wing member having a fork configured to receive a workpiece therein when in the deployed position;
   a flange disposed between the fastener head and the shank, the flange extending radially outboard of the shank; and
   a seal member disposed at a lower surface of the flange.

15. The assembly of claim 14, wherein the at least one wing member comprises at least two wing members.

16. The assembly of claim 14, wherein the shank has an outer periphery provided with at least one pocket, the pocket having a planar surface, the wing member being coupled to the planar surface.

17. The assembly of claim 14, wherein the fastener head and the shank have a bore extending therethrough, the bore extending along the central axis.

\* \* \* \* \*